(12) United States Patent
Villamora et al.

(10) Patent No.: US 9,560,240 B2
(45) Date of Patent: Jan. 31, 2017

(54) IMAGE FORMING APPARATUS CONFIGURED FOR CONTROLLING A PLURALITY OF IMAGE PROCESSING OPERATIONS

(71) Applicant: KYOCERA Document Solutions Inc., Osaka (JP)

(72) Inventors: Louella Villamora, Osaka (JP); Richelle Lopez, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/943,415

(22) Filed: Nov. 17, 2015

(65) Prior Publication Data

US 2016/0344899 A1 Nov. 24, 2016

(30) Foreign Application Priority Data

May 18, 2015 (JP) ................. 2015-101119

(51) Int. Cl.
*G06K 15/00* (2006.01)
*H04N 1/44* (2006.01)
*H04N 1/00* (2006.01)

(52) U.S. Cl.
CPC ........ *H04N 1/4413* (2013.01); *H04N 1/00212* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,460,692 B2* | 12/2008 | Mizutani | ............ | G06K 9/00255 358/1.14 |
| 8,305,599 B2* | 11/2012 | Matsushima | .......... | G03G 21/02 358/1.14 |
| 8,544,085 B2* | 9/2013 | Fusaka | ............... | H04N 1/00838 713/156 |
| 8,724,136 B2* | 5/2014 | Yamamoto | ......... | H04N 1/00244 358/1.14 |

(Continued)

FOREIGN PATENT DOCUMENTS

JP 2007-293418 A 11/2007

*Primary Examiner* — Dung Tran
(74) *Attorney, Agent, or Firm* — Studebaker & Brackett PC

(57) ABSTRACT

An image forming apparatus includes an operating panel, a user determination part, an attribute setting part, a selection button forming part and a processing operation executing part. The setting part sets, to each process, a first-attribute permitting execution without a password, a second-attribute permitting execution with the password or a third-attribute not permitting execution. The forming part forms each button of each process, if a first-authorized user, and forms each button of each process with the first- or second-attribute and no button of the process with the third-attribute, if a second-authorized user. The executing part executes, when the first-authorized user selects the button or the second-authorized user selects the button of the process with the first-attribute, the process about the selected button, and executes, when the second-authorized user selects the button of the process with the second-attribute, the process about the selected button when a valid password is inputted.

7 Claims, 14 Drawing Sheets

(56) References Cited

U.S. PATENT DOCUMENTS

| | | | | |
|---|---|---|---|---|
| 9,131,185 B2* | 9/2015 | Morita | ............... | H04N 1/4406 |
| 2006/0048234 A1* | 3/2006 | Imaizumi | .......... | G06F 17/30067 |
| | | | | 726/27 |
| 2006/0064741 A1* | 3/2006 | Terao | .................... | H04L 63/083 |
| | | | | 726/4 |
| 2006/0126100 A1* | 6/2006 | Jung | ................. | H04N 1/00856 |
| | | | | 358/1.14 |
| 2008/0168380 A1* | 7/2008 | Kodimer | ............... | G06F 9/4443 |
| | | | | 715/779 |
| 2009/0231637 A1* | 9/2009 | Kemmochi | ........ | H04N 1/00206 |
| | | | | 358/474 |
| 2011/0209225 A1* | 8/2011 | Nakamura | ............ | H04L 63/105 |
| | | | | 726/27 |
| 2012/0274971 A1* | 11/2012 | Tanabe | ................. | G06F 3/1222 |
| | | | | 358/1.14 |

* cited by examiner

FIG. 4
PROCESSING OPERATIONS IN MULTIFUNCTION PERIPHERAL

| CLASSIFICATION | SETTING ITEM | CONTENTS |
|---|---|---|
| COPY | DOCUMENT SIZE | SET READING SIZE OF DOCUMENT |
| | SHEET | SELECT CARTRIDGE OR MANUAL BYPASS |
| | DENSITY | SET DENSITY OF PRINTING |
| | COLOR/MONOCHROME | SELECT COLOR OR MONOCHROME PRINT |
| | HUE AND SATURATION | ADJUST HUE AND SATURATION |
| | EXPANSION/REDUCTION | SET EXPANSION OR REDUCTION RATE |
| | DUPLEX AND DIVISION | SET DUPLEX OR DIVISIONAL PRINT |
| E-MAIL TRANSMISSION | DOCUMENT SIZE | SET READING SIZE OF DOCUMENT |
| | TRANSMISSION SIZE | SET SIZE OF TRANSMITED IMAGE |
| | FILE TYPE | SET ATTACHED FILE TYPE |
| | READING RESOLUTION | SET READING RESOLUTION |
| | DOCUMENT NAME INPUT | INPUT DOCUMENT NAME |
| | TRANSMISSION RESERVE PRINT | SET WHETHER OR NOT PRINTING TRANSMISSION RESERVE |
| | ADDRESS NOTEBOOK | EDIT ADDRESS NOTEBOOK |
| | REPORT OUTPUT | OUTPUT TRANSMITTED/RECEIVED REPORT |
| FACSIMILE | DOCUMENT SIZE | SET READING SIZE OF DOCUMENT |
| | DENSITY | SET DENSITY OF PRINTING |
| | READING RESOLUTION | SET READING RESOLUTION |
| | ADDRESS NOTEBOOK | EDIT ADDRESS NOTEBOOK |
| | REPORT OUTPUT | OUTPUT TRANSMITTED REPORT |
| DOCUMENT STORAGE | DOCUMENT SIZE | SET READING SIZE OF DOCUMENT |
| | STORAGE SIZE | SET STORAGE SIZE |
| | READING RESOLUTION | SET READING RESOLUTION |
| | DOCUMENT NAME INPUT | INPUT DOCUMENT NAME |
| APPLICATION | APPLICATION1 | EXECUTE APPLICATION1 |
| | APPLICATION2 | EXECUTE APPLICATION2 |
| | APPLICATION3 | EXECUTE APPLICATION3 |
| | APPLICATION4 | EXECUTE APPLICATION4 |
| MANAGEMENT SETTING | KIND OF SHEET | SET KIND OF HANDLED SHEET |
| | CARTRIDGE AND MANUAL BYPASS | SET SHEET USED FOR CARTRIDGE OR MANUAL BYPASS |
| | ERROR HANDLING | SET ERROR HANDLING |
| | INITIAL VALUE OF COPYING FUNCTION | SET INITIAL VALUE OF COPYING |
| | INITIAL VALUE OF E-MAIL TRANSMISSION FUNCTION | SET INITIAL VALUE OF E-MAIL TRANSMISSION |
| | INITIAL VALUE OF FACSIMILE FUNCTION | SET INITIAL VALUE OF FACSIMILE |
| | INITIAL VALUE OF DOCUMENT STORAGE FUNCTION | SET INITIAL VALUE OF DOCUMENT STORAGE |
| | NETWORK | PROVIDE SETTING RELATED TO NETWORK |
| | SECURITY | PROVIDE SETTING RELATED TO SECURITY |
| | DATE | SET DATE |

FIG. 5

USER INFORMATION

| NAME | BELONGING SECTION | LOGIN NAME | LOGIN PASSWORD | AUTHORITY | EXECUTION RESTRICTION INFO. |
|---|---|---|---|---|---|
| MM MM | P GROUP | manager | KKKKKKKK | MANAGEMENT | |
| XX XX | R GROUP | xxxx-rg | EEEEEEEE | GENERAL | (SEE FIG. 6) |
| YY YY | S GROUP | yyyy-sg | HHHHHHHH | GENERAL | (SEE FIG. 7) |
| ⋮ | ⋮ | ⋮ | ⋮ | ⋮ | ⋮ |

FIG. 6

EXECUTION RESTRICTION INFORMATION OF USER X

| | PROCESSING OPERATION | ATTRIBUTE | EXECUTION PASSWORD |
|---|---|---|---|
| COPY | COPYING PROCESSING (SELECT ON HOME SCREEN) | 1 | |
| | DOCUMENT SIZE | 1 | |
| | SHEET | 1 | |
| | DENSITY | 1 | |
| | COLOR/MONOCHROME | 1 | |
| | HUE AND SATURATION | 1 | |
| | EXPANSION/REDUCTION | 1 | |
| | DUPLEX AND DIVISION | 1 | |
| E-MAIL TRANSMISSION | E-MAIL TRANSMISSION PROCESSING (SELECT ON HOME SCREEN) | 1 | |
| | DOCUMENT SIZE | 1 | |
| | TRANSMISSION SIZE | 1 | |
| | FILE TYPE | 1 | |
| | READING RESOLUTION | 1 | |
| | DOCUMENT NAME INPUT | 1 | |
| | TRANSMISSION RESERVE PRINT | 1 | |
| | ADDRESS NOTEBOOK | 2 | CCCCCCCC |
| | REPORT OUTPUT | 2 | CCCCCCCC |
| FACSIMILE | FACSIMILE PROCESSING (SELECT ON HOME SCREEN) | 1 | |
| | DOCUMENT SIZE | 1 | |
| | DENSITY | 1 | |
| | READING RESOLUTION | 1 | |
| | ADDRESS NOTEBOOK | 2 | CCCCCCCC |
| | REPORT OUTPUT | 2 | CCCCCCCC |
| DOCUMENT STORAGE | DOCUMENT STORAGE PROCESSING (SELECT ON HOME SCREEN) | 1 | |
| | DOCUMENT SIZE | 1 | |
| | STORAGE SIZE | 1 | |
| | READING RESOLUTION | 1 | |
| | DOCUMENT NAME INPUT | 1 | |
| APPLICATION | SELECT ON HOME SCREEN | 1 | |
| | APPLICATION1 | 1 | |
| | APPLICATION2 | 1 | |
| | APPLICATION3 | 2 | CCCCCCCC |
| | APPLICATION4 | 2 | CCCCCCCC |
| MANAGEMENT SETTING | SELECT ON HOME SCREEN | 1 | |
| | KIND OF SHEET | 1 | |
| | CARTRIDGE AND MANUAL BYPASS | 1 | |
| | ERROR HANDLING | 3 | |
| | INITIAL VALUE OF COPYING | 2 | NNNNNNNN |
| | INITIAL VALUE OF E-MAIL TRANSMISSION | 2 | NNNNNNNN |
| | INITIAL VALUE OF FACSIMILE | 2 | NNNNNNNN |
| | INITIAL VALUE OF DOCUMENT STORAGE | 2 | NNNNNNNN |
| | NETWORK | 3 | |
| | SECURITY | 3 | |
| | DATE | 3 | |

FIG. 7

EXECUTION RESTRICTION INFORMATION OF USER Y

| | PROCESSING OPERATION | ATTRIBUTE | EXECUTION PASSWORD |
|---|---|---|---|
| COPY | COPYING PROCESSING (SELECT ON HOME SCREEN) | 1 | |
| | DOCUMENT SIZE | 1 | |
| | SHEET | 1 | |
| | DENSITY | 1 | |
| | COLOR/MONOCHROME | 1 | |
| | HUE AND SATURATION | 3 | |
| | EXPANSION/REDUCTION | 1 | |
| | DUPLEX AND DIVISION | 3 | |
| E-MAIL TRANSMISSION | E-MAIL TRANSMISSION PROCESSING (SELECT ON HOME SCREEN) | 1 | |
| | DOCUMENT SIZE | 1 | |
| | TRANSMISSION SIZE | 1 | |
| | FILE TYPE | 1 | |
| | READING RESOLUTION | 1 | |
| | DOCUMENT NAME INPUT | 1 | |
| | TRANSMISSION RESERVE PRINT | 1 | |
| | ADDRESS NOTEBOOK | 2 | DDDDDDDD |
| | REPORT OUTPUT | 2 | DDDDDDDD |
| FACSIMILE | FACSIMILE PROCESSING (SELECT ON HOME SCREEN) | 1 | |
| | DOCUMENT SIZE | 1 | |
| | DENSITY | 1 | |
| | READING RESOLUTION | 1 | |
| | ADDRESS NOTEBOOK | 2 | DDDDDDDD |
| | REPORT OUTPUT | 2 | DDDDDDDD |
| DOCUMENT STORAGE | DOCUMENT STORAGE PROCESSING (SELECT ON HOME SCREEN) | 3 | |
| | DOCUMENT SIZE | 3 | |
| | STORAGE SIZE | 3 | |
| | READING RESOLUTION | 3 | |
| | DOCUMENT NAME INPUT | 3 | |
| APPLICATION | SELECT ON HOME SCREEN | 3 | |
| | APPLICATION1 | 3 | |
| | APPLICATION2 | 3 | |
| | APPLICATION3 | 3 | |
| | APPLICATION4 | 3 | |
| MANAGEMENT SETTING | SELECT ON HOME SCREEN | 1 | |
| | KIND OF SHEET | 1 | |
| | CARTRIDGE AND MANUAL BYPASS | 1 | |
| | ERROR HANDLING | 3 | |
| | INITIAL VALUE OF COPYING | 3 | |
| | INITIAL VALUE OF E-MAIL TRANSMISSION | 3 | |
| | INITIAL VALUE OF FACSIMILE | 3 | |
| | INITIAL VALUE OF DOCUMENT STORAGE | 3 | |
| | NETWORK | 3 | |
| | SECURITY | 3 | |
| | DATE | 3 | |

IMAGE FORMING APPARATUS CONFIGURED FOR CONTROLLING A PLURALITY OF IMAGE PROCESSING OPERATIONS

INCORPORATION BY REFERENCE

This application is based on and claims the benefit of priority from Japanese Patent application No. 2015-101119 filed on May 18, 2015, the entire contents of which are incorporated herein by reference.

BACKGROUND

The present disclosure relates to a multifunctional image forming apparatus capable of executing a plurality of processing operations including processing operations related to image forming.

At present, a multifunctional image forming apparatus generally called as a multifunction peripheral becomes widespread. Such image forming apparatuses each include a variety of functions, and for example, include: a copying function copying a document; an electric mail transmission function attaching a document image generated by scanning a document to an electric mail to transmit the electric mail with the attachment; a facsimile function carrying out facsimile transmission and reception of a document; a printer function printing document data transmitted from a personal computer or the like to a sheet; a document storage function internally storing a document image generated by scanning a document; and others.

Also, many of the image forming apparatuses include an operating panel having a touch panel display and button images are displayed in a screen of the touch panel display to thereby form selection buttons respectively corresponding to copy processing, electric mail transmission processing, facsimile processing, document storage processing and others. When a user touches the selection button with a finger, the image forming apparatus executes a processing operation corresponding to the selection button.

In addition, the recent image forming apparatus registers (stores) identification information, such as IDs or passwords of users, and kinds of authority for utilizing the image forming apparatus of the users. As the authority of the users for the processing operations that can be executed by the image forming apparatus in response to user selection (hereinafter, called as executable processing operations), there are management authority to enable the image forming apparatus execute all of the executable processing operations and general authority to enable the image forming apparatus execute only specific processing operations among the executable processing operations. Hereinafter, a person who is registered as the user having the management authority is referred to as a "management authorized user" and a person who is registered as the user having the general authority without having the management authority is referred to as a "general authorized user". When the user utilizes the image forming apparatus, the image forming apparatus requests the user to input identification information and identifies on the basis of the inputted identification information whether the user is the management authorized user or the general authorized user. Then, in a case where the user is the management authorized user, the image forming apparatus permits the user to execute all of the executable processing operations and, in a case where the user is the general authorized user, the image forming apparatus permits only the specific processing operations among the executable processing operations. In this manner, the security can be improved.

Further, some image forming apparatuses include a function controlling in accordance with the user authority whether or not to form each selection button in the screen of the touch panel display of the operating panel. That is, in the case where the user is the management authorized user, an image forming apparatus forms the selection buttons respectively corresponding to all of the executable processing operations (incidentally, this includes a case of disposing all of the selection buttons in a distributed manner in a plurality of switchable screens in addition to a case of disposing all of the selection buttons in one screen). On the other hand, in the case where the user is the general authorized user, the image forming apparatus forms only specific selection buttons respectively corresponding to the specific processing operations with permission of execution for the general authorized user among the executable processing operations. In this manner, when the general authorized user operates the image forming apparatus, operability of the image forming apparatus can be improved.

For example, a technique controlling to display icons in an interface screen in accordance with a group to which a user belongs is known.

Incidentally, as mentioned above, in the case where the user is the general authorized user, there is a function in which the selection buttons formed in the screen of the touch panel display of the operating panel are limited to only the specific selection buttons respectively corresponding to the specific processing operations among the executable processing operations. However, such a function may lack the convenience as mentioned later.

That is, there may be a case in which a plurality of users of image forming apparatus other than managers exist, and the scopes of processing operations of the image forming apparatus with permission of execution are made different from each other depending on these users. In such a case, the general authority is subdivided into a plurality of kinds of authority, for example, high level authority, middle level authority, and low level authority, and settings to define processing operations with permission of execution for each kind of subdivided authority must be carried out for the image forming apparatus. As a result, the work of setting becomes complicated and the convenience is impaired.

Also, for example, in a case where a user other than a manager temporarily acts for a part of the manager's duties or the like, there may arise a need to make the user registered as the general authorized user temporarily carry out some of the processing operations of the image forming apparatus without permission of execution. In this case, it is possible to cope with such circumstance by changing the processing operations permitted to be executed by the user registered as the general authorized user or by teaching the manager identification information to the user other than the manager, and however, in the former, a burden on the work of setting may arise, and in the latter, lowering of the security may result.

SUMMARY

In accordance with an embodiment of the present disclosure, an image forming apparatus for executing a plurality of processing operations including processing operations related to image forming includes an operating panel, a user determination part, an attribute setting part, a selection button forming part and a processing operation executing part. The operating panel has a touch panel display. The user determination part is configured so as to determine on the basis of identification information inputted by a user whether the user is a first authorized user having at least first authority or a second authorized user having second authority. The attribute setting part is configured so as to set, with respect to each of the plurality of processing operations, a first attribute which permits execution without password input being set as a condition, a second attribute which permits execution with password input being set as a condition, or a third attribute which does not permit execution. The selection button forming part is configured so as to display button images in a screen of the touch panel display to thereby form a selection button corresponding to any of the plurality of processing operations and to switch whether or not the button image is displayed to thereby control whether or not the selection button is formed with respect to each of the plurality of processing operations, wherein the selection button forming part forms a plurality of the selection buttons respectively corresponding to all of the plurality of processing operations, in a case where the user determination part determines that the user is the first authorized user, and forms a plurality of the selection buttons respectively corresponding to the processing operations to which the first attribute or the second attribute has been set and does not forms the selection buttons corresponding to the processing operations to which the third attribute has been set, in a case where the user determination part determines that the user is the second authorized user. The processing operation executing part is configured so as to execute, when the user having been determined as the first authorized user by the user determination part has selected any one of the plurality of the selection buttons that are formed by the selection button forming part, the processing operation corresponding to the selected selection button, to execute, when the user having been determined as the second authorized user by the user determination part has selected the selection button corresponding to the processing operation to which the first attribute has been set, among the plurality of the selection buttons that are formed by the selection button forming part, the processing operation corresponding to the selected selection button, and to request a password input, when the user having been determined as the second authorized user by the user determination part has selected the selection button corresponding to the processing operation to which the second attribute has been set, among the plurality of the selection buttons that are formed by the selection button forming part, and to execute, when a valid password has been inputted, the processing operation corresponding to the selected selection button.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 4 is a chart showing classification of processing operations in the multifunction peripheral as the image forming apparatus according to the embodiment of the present disclosure.

FIG. 5 is a chart showing user information in the multifunction peripheral as the image forming apparatus according to the embodiment of the present disclosure.

FIG. 6 is a chart showing execution restriction information in the multifunction peripheral as the image forming apparatus according to the embodiment of the present disclosure.

FIG. 7 is a chart showing another example of the execution restriction information in the multifunction peripheral as the image forming apparatus according to the embodiment of the present disclosure.

DETAILED DESCRIPTION (Configuration of Multifunction Peripheral)

Figure 1:
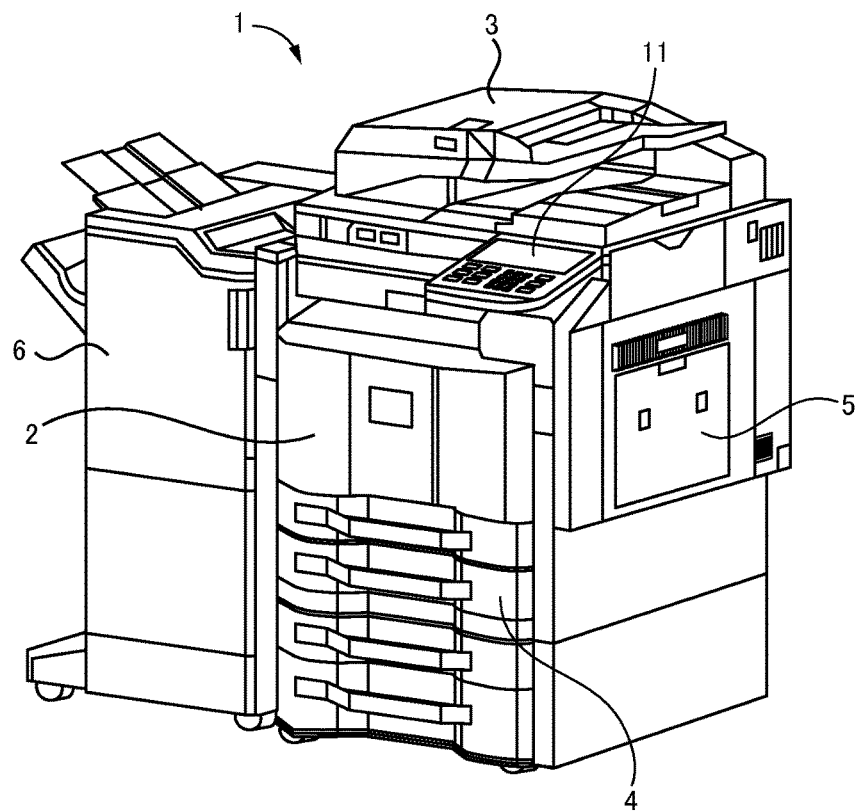
FIG. 1 is a perspective view showing an appearance of a multifunction peripheral as an image forming apparatus according to an embodiment of the present disclosure.

FIG. 1 shows an appearance of a multifunction peripheral as an image forming apparatus according to an embodiment of the present disclosure. In FIG. 1, a multifunction peripheral 1 is a multifunctional image forming apparatus including: a copying function; an electric mail transmission function; a facsimile function; a printer function; a document storage function; an application executing function; and others. The multifunction peripheral 1 includes a multifunction peripheral main body 2 including a box-shaped casing and, at an upper part of the multifunction peripheral main body 2, a document feeding device 3 is provided. The document feeding device 3 automatically feeds a document to a document reading position on a document glass of the multifunction peripheral main body 2 when copying, facsimile transmission or the like is carried out. Also, at a lower part of the multifunction peripheral main body 2, a plurality of cartridges 4 storing sheets are provided. The cartridges 4 can store the sheets of respective different sizes from each other. In addition, at one side part of the multifunction peripheral main body 2, a manual bypass tray 5 used for manually feeding the sheet is provided. Further, at the other side part of the multifunction peripheral main body 2, a post-processing device 6 is provided. The post-processing device 6 carries out post-processing operations for the sheet, such as sorting, punching and sheet folding, after an image has been printed. Furthermore, at a front part of the multifunction peripheral main body 2, an operating panel 11 for a user to operate the multifunction peripheral 1 is provided.

Figure 2:
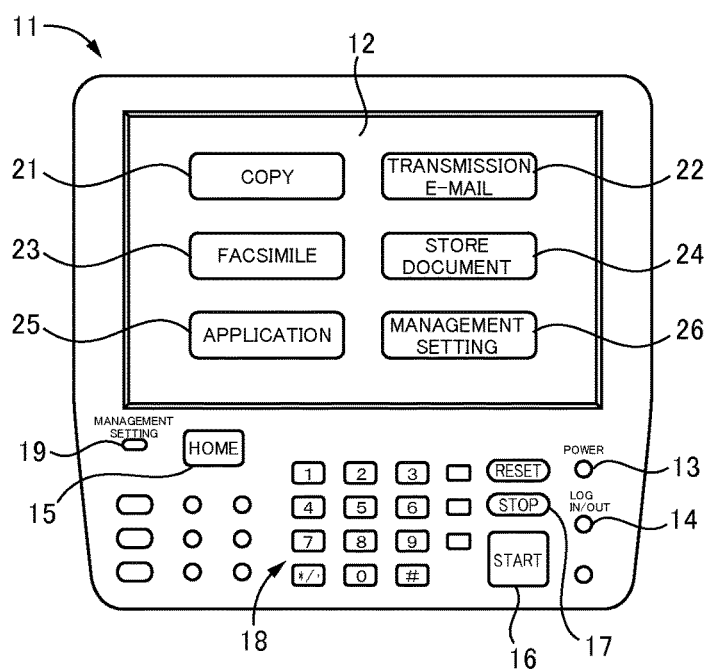
FIG. 2 is a plan view of an operating panel of the multifunction peripheral as the image forming apparatus according to the embodiment of the present disclosure.

FIG. 2 shows an operating panel 11 of the multifunction peripheral 1. As shown in FIG. 2, the operating panel 11 includes a touch panel display 12. The touch panel display 12 includes: a display function displaying an image; and a touch position detection function detecting a touch position when the user touches a screen by a finger.

Also, the operating pane 11 includes a plurality of operating buttons for a user to operate the multifunction peripheral 1. Structurally, on the operating panel 11, as operating buttons, there are hardware push buttons and software touch buttons. The hardware push buttons are provided on the operating panel 11 and disposed at a lower side of the touch panel display 12. On the other hand, the software touch buttons are formed by displaying images made in respective button shapes (button images or button icons) in the screen of the touch panel display 12. The multifunction peripheral 1 is capable of changing whether or not each software touch button is formed and a position of each software touch button in the screen.

In addition, in the functional point of view, on the operating panel 11, as operating buttons, there are: a power button 13; a login/logout button 14; a home button 15; selection buttons; a start button 16; a stop button 17; numeric buttons 18; and others. The power button 13 is a button for turning on or off the power of the multifunction peripheral 1. The login/logout button 14 is a button for a user to log in or log out the multifunction peripheral 1. The home button 15 is a button for switching the screen of the touch panel display 12 to a home screen. The selection buttons are buttons for a user to select each of processing operations that can be executed by the multifunction peripheral 1. The start button 16 is a button for starting execution of each processing operation. The stop button 17 is a button for stopping execution of each processing operation. The numeric buttons 18 are buttons for inputting numeric values.

The selection buttons, as software touch buttons, are formed in the screen of the touch panel display 12. The multifunction peripheral 1 is capable of forming, in the screen of the touch panel display 12, the selection buttons corresponding to the respective processing operations that can be executed by the multifunction peripheral 1 in response to user selection. Also, the multifunction peripheral 1 forms a plurality of screens disposing several selection buttons corresponding to the processing operations that can be executed in response to the user selection. The user can find out a desired selection button by switching the screen and can operate the desired selection button.

FIG. 2 shows a state in which the screen of the touch panel display 12 is the home screen. In this state, in the screen of the touch panel display 12, as the selection buttons, a copy button 21, an electric mail transmission button 22, a facsimile button 23, a document storage button 24, an application button 25 and a management setting button 26 are formed. The copy button 21 is a button operated by the user making the multifunction peripheral 1 execute copy processing. The electric mail transmission button 22 is a button operated by the user making the multifunction peripheral 1 execute electric mail transmission processing. The facsimile button 23 is a button operated by the user making the multifunction peripheral 1 execute facsimile processing. The document storage button 24 is a button operated by the user making the multifunction peripheral 1 execute document storage processing. The application button 25 is a button operated by the user making the multifunction peripheral 1 execute an application. The management setting button 26 is a button operated by the user making the multifunction peripheral 1 execute management setting.

Incidentally, among the selection buttons, as to the management setting buttons, there are: a management setting button 26 formed in the screen of the touch panel display 12 as the software touch button; and a management setting button 19 formed on the operating panel 11 as the hardware push button. The user having management authority can carry out management setting of the multifunction peripheral 1 by pushing the management setting button 26 as the software touch button or by pushing the management setting button 19 as the hardware push button.

Figure 3:
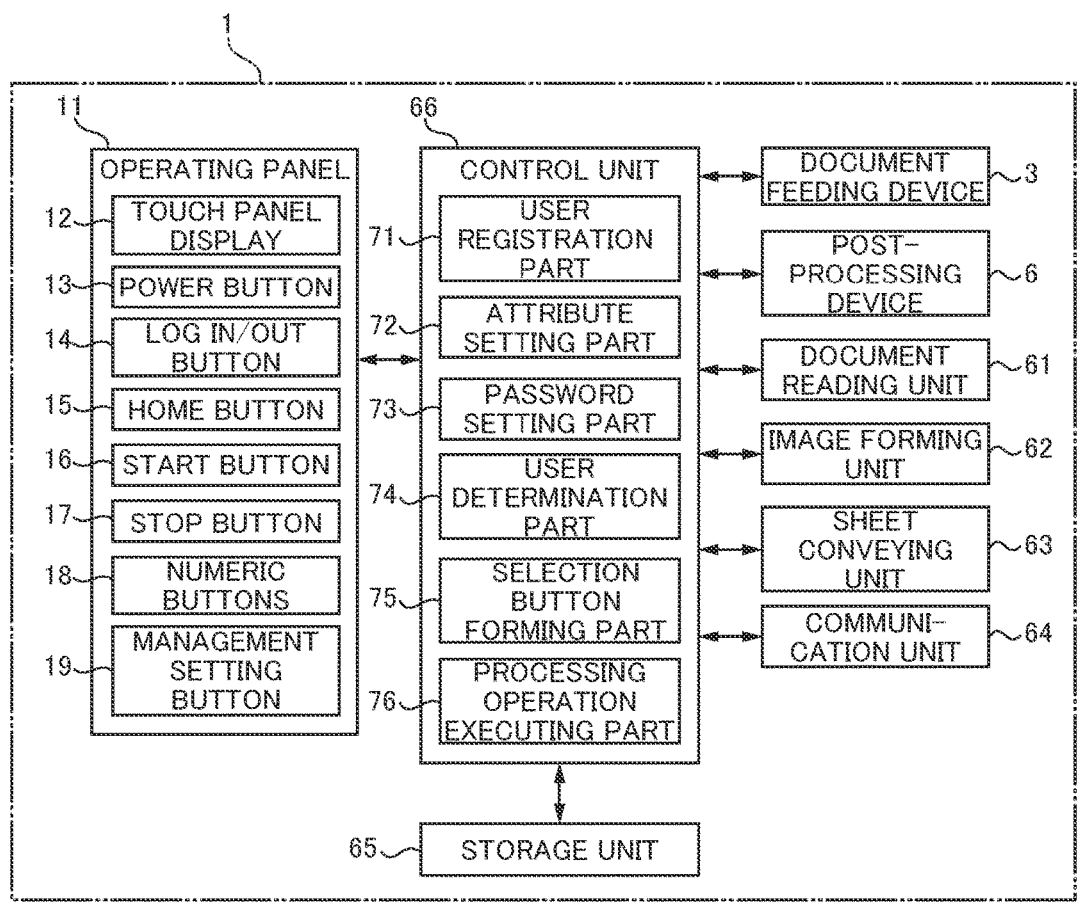
FIG. 3 is a block diagram showing an electrical configuration of the multifunction peripheral as the image forming apparatus according to the embodiment of the present disclosure.

FIG. 3 shows an electrical configuration of the multifunction peripheral 1. As shown in FIG. 3, the multifunction peripheral 1 further includes: a document reading unit 61; an image forming unit 62; a sheet conveying unit 63; a communication unit 64; a storage unit 65; a control unit 66; and others. These units are provided inside of the multifunction peripheral main body 2. The document reading unit 61 is a unit generating a document image by optically scanning a document. The image forming unit 62 is a device printing the document image to the sheet. For example, the image forming unit 62 emits laser light to an electrically charged photosensitive drum to form a latent image corresponding to the document image, develops the formed image by using a toner and transfers and fixes the developed image onto the sheet. The sheet conveying unit 63 includes a conveying roller and others, and is a unit conveying the sheet stored in the cartridge 4 to the image forming unit 62 and ejects the sheet with the image printed by the image forming unit 62 to a sheet ejecting tray or the like provided in the multifunction peripheral main body 2 or conveys the sheet to the post-processing device 6. The communication unit 64 is a device controlling facsimile communication, communication using Internet and communication using a local area network. The storage unit 65 is a unit storing information and includes a hard disk unit or the like.

Further, the control unit 66 is a unit controlling the multifunction peripheral 1 and includes a CPU (Central Processing Unit) or the like. The control unit 66 functions as a user registration part 71, an attribute setting part 72, a password setting part 73, a user determination part 74, a selection button forming part 75 and a processing operation executing part 76 by reading and executing a computer program stored in the storage unit 65, for example.

The user registration part 71 carries out user registration processing to register the user in the multifunction peripheral 1. The attribute setting part 72 sets any one of a first attribute, a second attribute and a third attribute, as described later, with respect to each of a plurality of processing operations that can be executed by the multifunction peripheral 1 in response to the user selection. The password setting part 73 sets an execution password for executing the processing operation for which the second attribute has been set. The user determination part 74 determines who the user is and determines whether the user is a management authorized user (a first authorized user) or a general authorized user (a second authorized user) on the basis of a login name and a login password inputted by the user. The selection button forming part 75 carries out selection button forming processing forming the selection button in the screen of the touch panel display 12. The processing operation executing part 76 executes, when the user has selected the selection button, the processing operation corresponding to the selected selection button.

(Processing Operations in Multifunction Peripheral)

FIG. 4 shows the processing operations that can be executed by the multifunction peripheral 1 in response to the user selection. For example, as to the processing operations that can be executed by the multifunction peripheral 1 in response to the user selection, as shown in a field of "classification of processing operations" in FIG. 4, there are the copy processing, the electric mail transmission processing, the facsimile processing and the document storage processing. The copy processing is a processing operation copying the document onto the sheet. The electric mail transmission processing is a processing operation reading the document, attaching the document image to the electric mail and transmitting the electric mail with the attachment. The facsimile processing is a processing operation carrying out facsimile transmission and others of the document. The document storage processing is a processing operation reading the document and storing the document image to the storage unit 65 of the multifunction peripheral 1.

Further, among the processing operations that can be executed by the multifunction peripheral 1 in response to the user selection, as shown in a field of "setting items" in FIG. 4, there are the processing operations setting the respective setting items with respect to the copy processing, the electric mail transmission processing, the facsimile processing and the document storage processing. For example, as to the copy processing, there are: the processing operation setting a read size of the document; the processing operation selecting a desired cartridge or manual bypass feed; the processing operation setting a density of printing; the processing operation selecting color printing or monochrome printing; the processing operation adjusting hue and saturation; the processing operation setting an expansion rate or a reduction rate; the processing operation setting duplex printing or divisional printing; and others.

Furthermore, among the processing operations that can be executed by the multifunction peripheral 1 in response to the user selection, there are the processing operations to be provided by applications installed in the multifunction peripheral 1. That is, the multifunction peripheral 1 is capable of extending a function by adding the application. The user installs the application in the multifunction peripheral 1 via the Internet or the local area network and can make the multifunction peripheral 1 execute the processing operation by the installed application. The user can install a plurality of applications in the multifunction peripheral 1 and can select the application to be executed. In the embodiment, as shown in FIG. 4, a case in which four applications are installed in the multifunction peripheral 1 is taken as an example.

In addition, as to the processing operations that can be executed by the multifunction peripheral 1 in response to the user selection, there is management setting. The management setting has the processing operation setting a variety of items in addition to items related to management of the multifunction peripheral 1. As shown in FIG. 4, for example, as to the management setting, there are: the processing operation setting a kind of the sheet to be handled; the processing operation setting the sheet to be used by the cartridge or by manual bypass feed; the processing operation setting initial values as to the respective setting items, such as the copy processing, the electric mail transmission processing, the facsimile processing, the document storage processing and others; the processing operation setting error handling; the processing operation providing settings related to network; the processing operation providing settings related to security; the processing operation setting date; and others.

(User Registration)

FIG. 5 shows user information and FIG. 6 and FIG. 7 show execution restriction information. The user registration part 71 of the multifunction peripheral 1 carries out the user registration processing to carry out user registration of the multifunction peripheral 1. The user registration items are, as shown in FIG. 5, a name, a belonging section, a login name, a login password, authority and execution restriction information. Incidentally, although the items of the name and the belonging section may be provided preferably for the purpose of the convenience of management by a manager, the items can be omitted. The multifunction peripheral 1 is capable of registering a plurality of users. The multifunction peripheral 1 stores the information related to each registration item of each user as user information in the storage unit 65.

Among the user registration items mentioned above, the authority is authority for utilizing the multifunction peripheral 1 of the user and there are management authority (first authority) and general authority (second authority). The management authority is authority to enable the multifunction peripheral 1 to execute all of the processing operations that can be executed by the multifunction peripheral 1 in response to the user selection. The general authority is authority to enable the multifunction peripheral 1 to execute only specific processing operations among the processing operations that can be executed by the multifunction peripheral 1 in response to the user selection.

Also, among the user registration items mentioned above, the execution restriction information is information related to restriction of the scopes of the processing operations that a person who is registered in the multifunction peripheral 1 as the user having the general authority, i.e. the general authorized user can make the multifunction peripheral 1 execute.

The multifunction peripheral 1 can apply restriction on the scopes of the processing operations that the general authorized user can make the multifunction peripheral 1 execute, by setting attributes to the respective processing operations that can be executed by the multifunction peripheral 1 in response to the user selection. That is, the attribute setting part 72 of the multifunction peripheral 1 sets any one of the first attribute, the second attribute and the third attribute with respect to the respective processing operations that can be executed by the multifunction peripheral 1 in response to the user selection. The first attribute is an attribute to an extent such that execution is permitted without inputting an execution password as a condition. The second attribute is an attribute to an extent such that execution is permitted with input of an execution password as a condition. The third attribute is an attribute to an extent such that execution is not permitted.

The processing operations that can make the multifunction peripheral 1 execute includes not only the processing operations (jobs) including image forming processing, such as copy, electric mail transmission, facsimile and document storage, but also the processing operation setting modes, conditions or restrictions of these processing operations. Further, the processing operations that can be executed by the multifunction peripheral 1 include the processing operations of the applications. Furthermore, the processing operations that can make the multifunction peripheral 1 execute includes the processing operations, as the management setting, setting operating modes, operating conditions or operating restrictions of the multifunction peripheral 1 other than image forming processing.

Also, in a case where a plurality of users are respectively registered in the multifunction peripheral 1 as the users having the general authority, the attribute setting part 72 is capable of setting items of the execution restriction information which are respectively different from each other depending on the plurality of these users.

In addition, the execution password is an array of signs of the order of eight digits, for example, and it is desirable that this password be different from the user login password as described above. The execution passwords can be made different from each other depending on the processing operations. Further, the execution passwords can be made different from each other depending on the users.

Here, a user M with a login name "manager" in FIG. 5 is a person who is registered in the multifunction peripheral 1 as the user having the management authority, i.e., the management authorized user. The multifunction peripheral 1 does not apply restriction on the processing operations that the management authorized user can make the multifunction peripheral 1 execute. Therefore, the execution restriction information with respect to the management authorized user is not provided. Incidentally, with respect to the management authorized user, the execution restriction information may be generated so that the first attributes are respectively set as to all of the processing operations that can be executed by the multifunction peripheral 1 in response to the user selection.

Also, a user X with a login name "xxxx-rg" in FIG. 5 is the general authorized user, and the execution restriction information of the user X is as shown in FIG. 6, for example. According to FIG. 6, the user X can make the multifunction peripheral 1 execute the copy processing without inputting the execution password, and moreover, can set all of the settings related to copying without inputting the execution password. Further, the user X can make the multifunction peripheral 1 execute the electric mail transmission processing without inputting the execution password, and can provide settings related to the electric mail transmission processing without inputting the execution password except settings of an address notebook and outputting of a report. However, the user X cannot carry out setting of the address notebook and outputting of the report unless the execution password has been inputted. Settings related to the facsimile processing are treated in almost the same way. In addition, the user X can make the multifunction peripheral 1 execute the document storage processing without inputting the execution password, and can carry out all of the settings related to document storage without inputting the execution password. Further, the user X can make the multifunction peripheral 1 execute two applications of the four applications that are installed in the multifunction peripheral 1 without inputting the execution password, but cannot make the multifunction peripheral 1 execute the remaining two applications unless the execution password has been inputted. Furthermore, the user X can provide settings of a kind of sheet, the cartridge and the manual bypass feed among the management settings, but cannot provide initial value settings of copying, electric mail transmission and others unless the execution password has been inputted. Still furthermore, the user X cannot provide settings of error handling, network, security and date among the management settings at all.

Also, a user Y of with a login name "yyyy-rg" in FIG. 5 is the general authorized user, and the execution restriction information of this user is as shown in FIG. 7, for example. According to FIG. 7, the user Y can make the multifunction peripheral 1 execute the copy processing without inputting the execution password, and can provide settings related to copying without inputting the execution password except for settings of hue, saturation, duplex printing and divisional printing. In addition, with respect to electric mail transmission and facsimile, the restriction on the scopes of the processing operations that the user Y can make the multifunction peripheral 1 execute is the same as the restriction on the scopes of the processing operations that the user X can make the multifunction peripheral 1 execute. Further, the user Y cannot make the multifunction peripheral 1 execute document storage at all, and cannot provide settings related to document storage at all. Furthermore, the user Y cannot make the multifunction peripheral 1 execute any of the applications that are installed in the multifunction peripheral 1 at all. Still furthermore, the user Y can provide settings of a kind of sheet, cartridge and manual bypass feed among the management settings without inputting the execution password, but cannot provide initial value setting of copying, electric mail transmission and others, and settings of error handling, network, security and date at all.

FIG. 8A and FIG. 8B and FIG. 9A to FIG. 9D show respective screens to be displayed on the touch panel display 12 for the purpose of carrying out user registration. The user registration can be carried out by only the management authorized user. Because setting of the execution restriction information is a part of the user registration, the setting of the execution registration information also can be provided by only the management authorized user. That is, when the user who is registered in the multifunction peripheral 1 as the management authorized user inputs his or her own login name and login password at the time of logging in the multifunction peripheral 1, the user determination part 74 of the multifunction peripheral 1 determines that the user is the management authorized user. Only in this case, the attribute setting part 72 permits the user to carry out the user registration. For example, only for the management authorized user, the user registration item may be displayed as a management setting item (it is to be noted that, in FIG. 12A, a selection button corresponding to the user registration is not shown). Because only the management authorized user can carry out the user registration including setting of the execution restriction information, it is possible to improve the security. Incidentally, in a case where the management authorized user is not registered, such as when the multifunction peripheral 1 is utilized first time, for example, registration of the management authorized user is carried out by inputting a special login name and a special login password, each of which has been initially set by a manufacturer of the multifunction peripheral 1. After the registration, the special login name and the special login password initially set by the manufacturer are deleted.

If the management authorized user carries out an operation about starting of the user registration to the multifunction peripheral 1, the user registration part 71 of the multifunction peripheral 1 starts the user registration processing. In the user registration processing, the user registration part 71 firstly displays a user registration screen 80 shown in FIG. 8A on the touch panel display 12 of the operating panel 11. The management authorized user can input the name, the attribute, the login name and the login password of a user by operating user information setting buttons 81 and others. Also, when the management authorized user pushes the user information setting button 81 as to the authority (when the user information setting button 81 is touched), the user registration part 71 displays a authority setting screen 82 shown in FIG. 8B on the touch panel display 12. The management authorized user can set the authority of a user to be registered, by pushing either of a management authority button 83 and a general authority button 84 in the authority setting screen 82, and subsequently, by pushing a completion button 85.

Figure 8A:
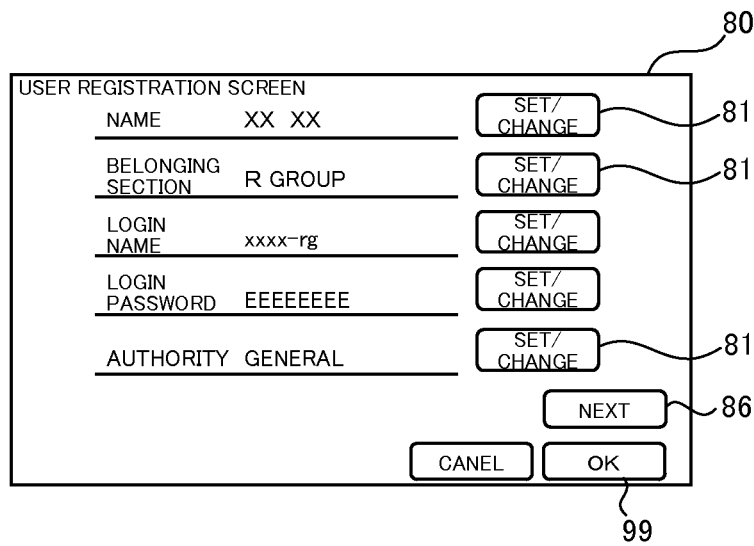
FIG. 8A is a plan view showing a user registration screen.
Figure 8B:
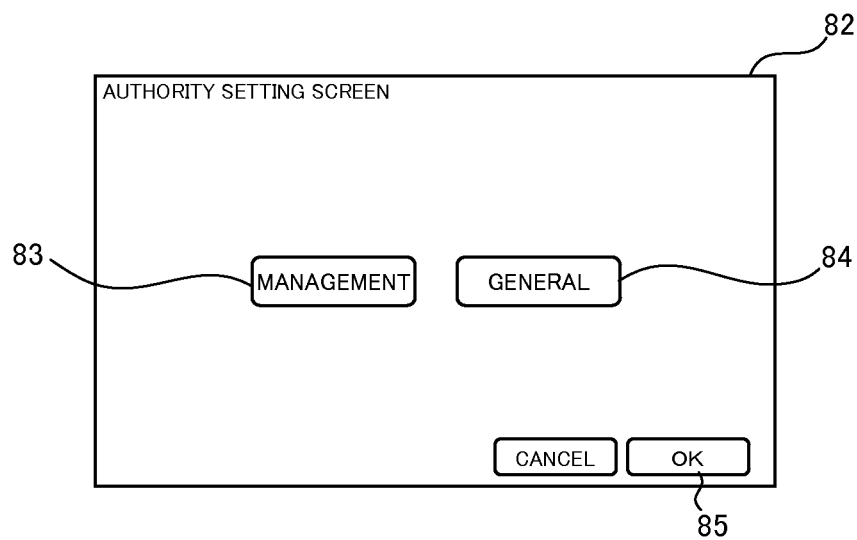
FIG. 8B is a plan view showing a authority setting screen, in the multifunction peripheral as the image forming apparatus according to the embodiment of the present disclosure.
Figure 9A:
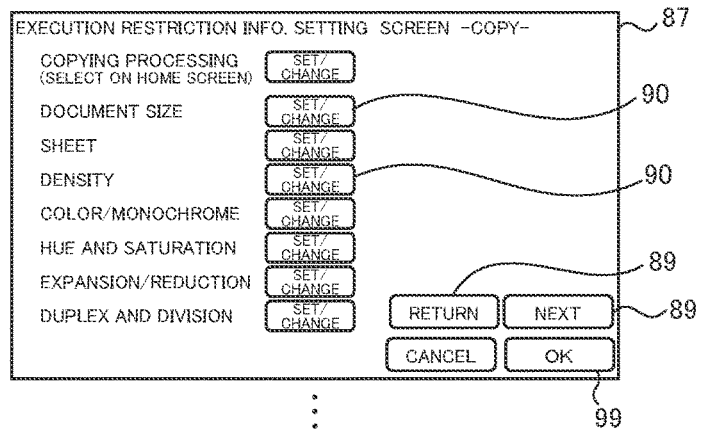
FIG. 9A is a plan view showing an execution restriction information setting screen related to copying.
Figure 9B:
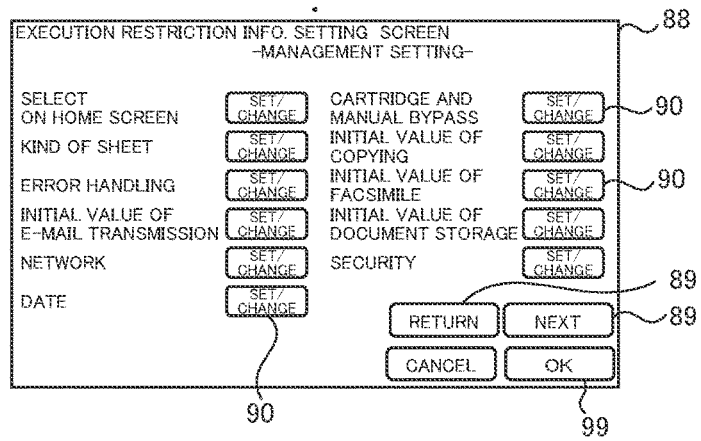
FIG. 9B is a plan view showing an execution restriction information setting screen related to management setting.
Figure 9C:
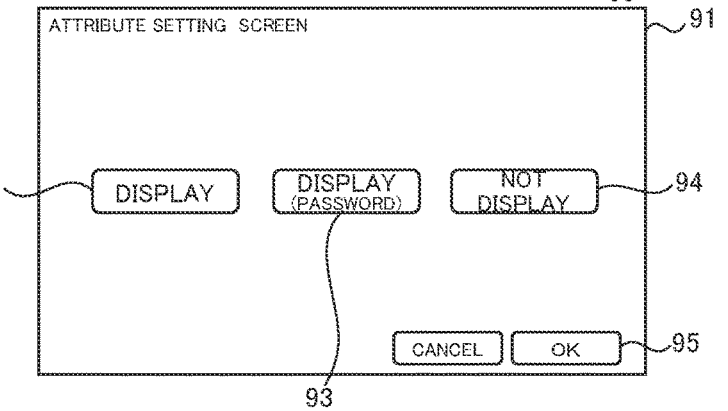
FIG. 9C is a plan view showing an attribute setting screen.
Figure 9D:
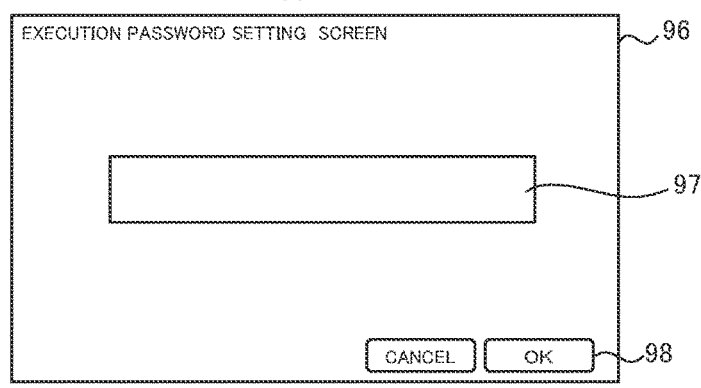
FIG. 9D is a plan view showing an execution password setting screen, in the multifunction peripheral as the image forming apparatus according to the embodiment of the present disclosure.

Further, when the management authorized user pushes a screen switching button 86 in the user registration screen 80 shown in FIG. 8A, the user registration part 71 displays an execution restriction information setting screen 87 shown in FIG. 9A, for example, on the touch panel display 12. A plurality of execution restriction information setting screens are provided for each classification of processing operations in the multifunction peripheral 1, for example, the execution restriction information setting screens related to copying, electric mail transmission, facsimile, document storage, applications, management setting and others may be provided. The execution restriction information setting screen 87 shown in FIG. 9A is related to copying, and an execution restriction information setting screen 88 shown in FIG. 9B is related to management setting. When the management authorized user pushes a screen switching button 89 in the execution restriction information setting screen, the user registration part 71 switches the execution restriction setting screen to another execution restriction setting screen. Also, in the execution restriction information setting screen, when the management authorized user pushes an execution restriction information setting button 90 corresponding to any processing operation, the user registration part 71 displays an attribute setting screen 91 shown in FIG. 9C on the touch panel display 12. When the management authorized user pushes an attribute button 92 in the attribute setting screen 91 and subsequently pushes a completion button 98, the user registration part 71 sets the first attribute with respect to the processing operation corresponding to the execution restriction information setting button pushed in the execution restriction information setting screen. In addition, when the management authorized user pushes an attribute button 93 in the attribute setting screen 91, the password setting part 73 displays an execution password setting screen 96 shown in FIG. 9D. When the management authorized user inputs the execution password to the execution password setting input part 97 in the execution password setting screen 96 and subsequently pushes a completion button 98, the user registration part 71 sets the second attribute with respect to the processing operation corresponding to the execution restriction information setting button pushed in the execution restriction information setting screen, and the password setting part 73 sets the execution password for the processing operation. Further, when the management authorized user pushes an attribute button 94 in the attribute setting screen 91 and subsequently pushes the completion button 95, the user registration part 71 sets the third attribute with respect to the processing operation corresponding to the execution restriction information setting button pushed in the execution restriction information setting screen.

Furthermore, when the management authorized user pushes a completion button 99 in the user registration screen 80 or in any execution restriction information setting screen, the user registration part 71 stores the information related to the presently inputted and set user registration item as user information in the storage unit 65, and subsequently, completes the user registration processing.

(Forming Selection Buttons)

Figure 10A:
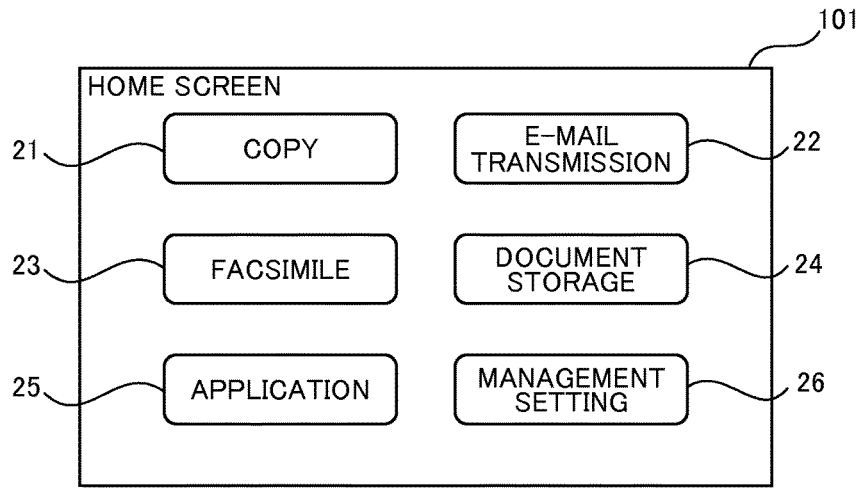
FIG. 10A, FIG. 10B, and FIG. 10C are illustrative views each showing a home screen in the multifunction peripheral as the image forming apparatus according to the embodiment of the present disclosure.
Figure 10B:
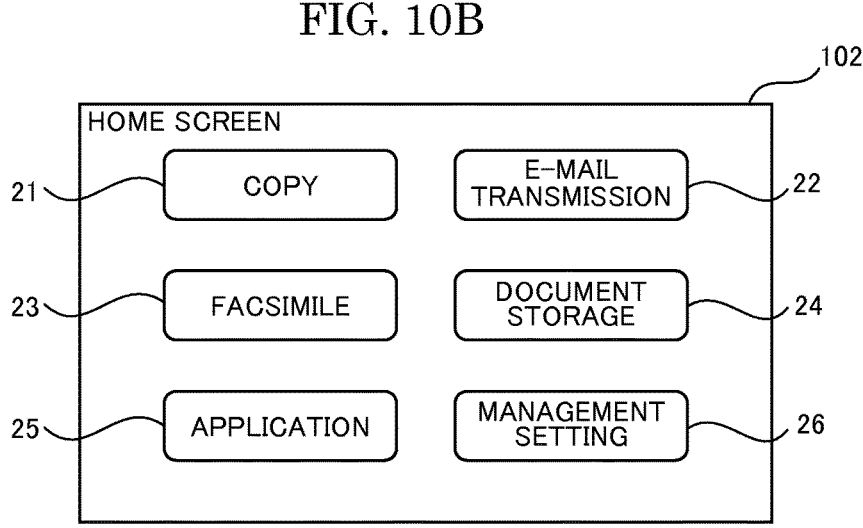
Figure 10C:
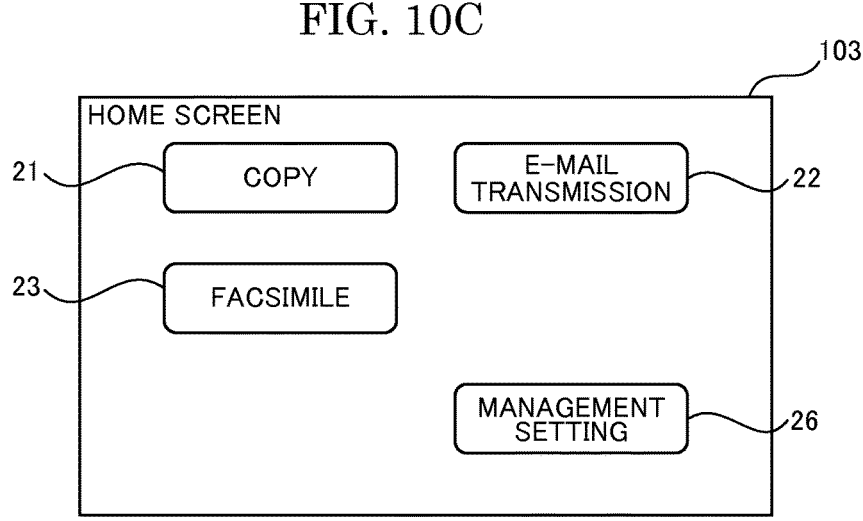
Figure 11A:
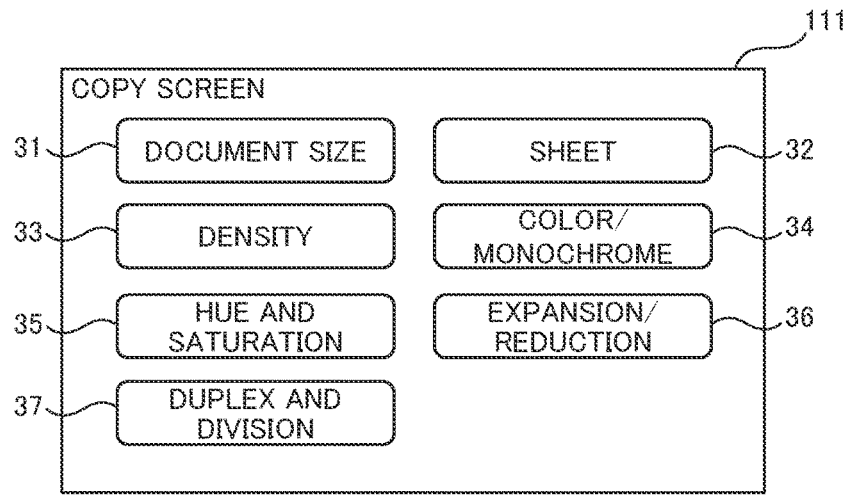
FIG. 11A, FIG. 11B, and FIG. 11C are plan views each showing a copying screen in the multifunction peripheral as the image forming apparatus according to the embodiment of the present disclosure.
Figure 11B:
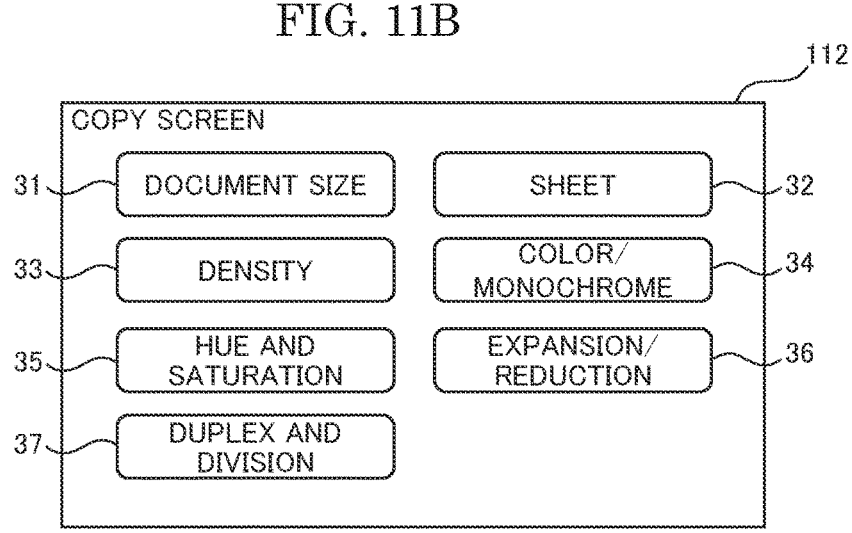
Figure 11C:
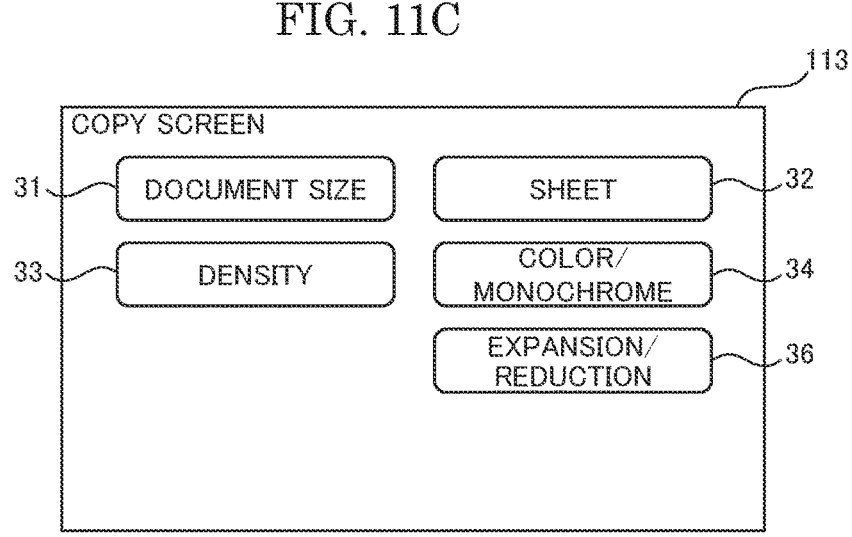
Figure 12A:
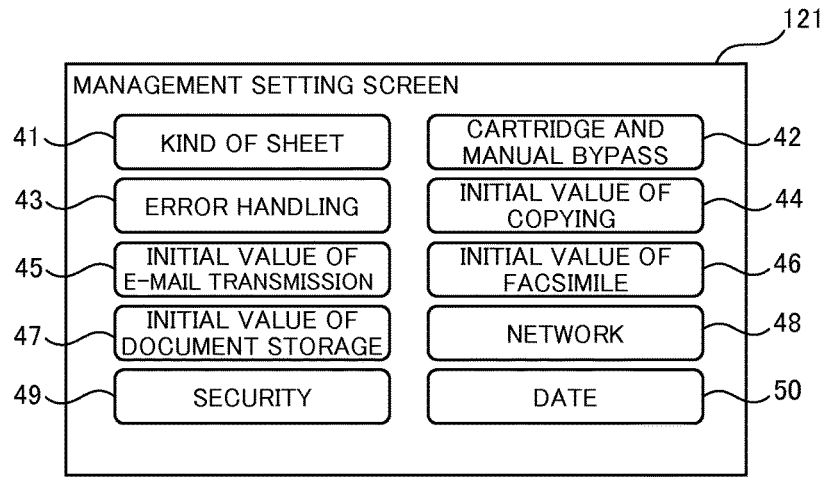
FIG. 12A, FIG. 12B, and FIG. 12C are plan views each showing a management setting screen in the multifunction peripheral as the image forming apparatus according to the embodiment of the present disclosure.
Figure 12B:
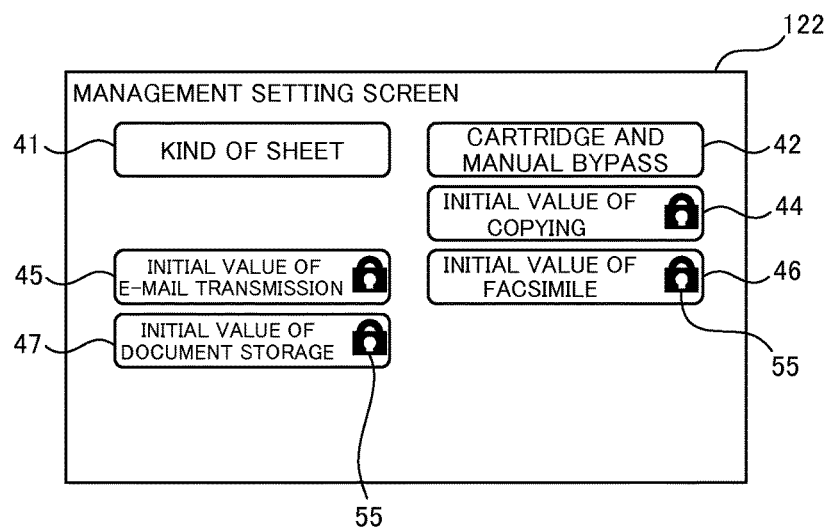
Figure 12C:
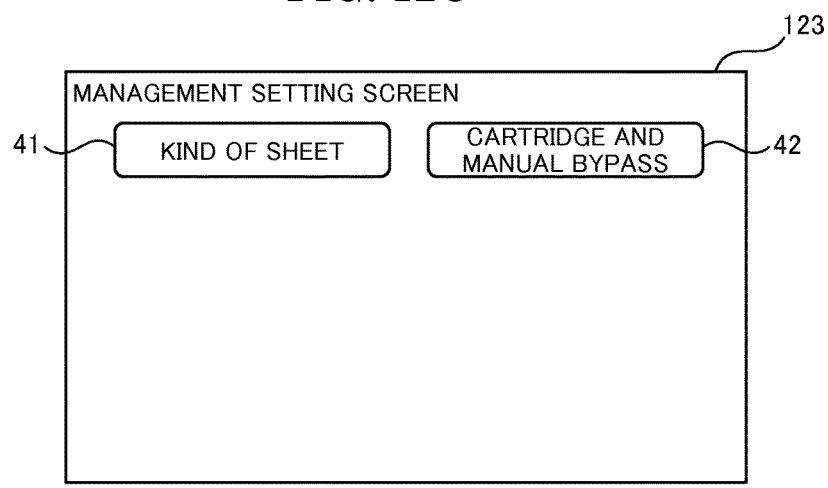

FIG. 10A, FIG. 10B and FIG. 10C show respective home screens of the users M, X and Y. FIG. 11A, FIG. 11B and FIG. 11C shows respective copying screens of the users M, X and Y. FIG. 12A, FIG. 12B and FIG. 12C show respective management setting screens of the users M, X and Y. The selection button forming part 75 of the multifunction peripheral 1 carries out selection button forming processing to form selection buttons in the screen of the touch panel display 12 of the operating panel 11.

The selection button forming part 75 is capable of forming, in the screen of the touch panel display 12, the selection buttons corresponding to the respective processing operations that can be executed by the multifunction peripheral 1 in response to the user selection. As the screen of the touch panel display 12, there are a plurality of screens, such as the home screen, the copying screen, an electric mail transmission screen, a facsimile screen, a document storage screen, an application screen and the management setting screen, and the selection buttons corresponding to the respective processing operations that can be executed by the multifunction peripheral 1 in response to the user selection are disposed in a distributed manner in these screens.

The selection button forming part 75 determines on the basis of the execution restriction information included in the user information whether or not the selection buttons are formed, and determines, in a case where the selection buttons are formed, display modes of the selection buttons. That is, by the user registration processing as described above, the attributes set to the respective processing operations that can be executed by the multifunction peripheral 1 in response to the user selection are stored in the storage unit 65 as the execution restriction information. The selection button forming part 75 forms the selection button corresponding to the processing operation to which the first attribute is set, in a first display mode. In the embodiment, the first display mode of the selection button is a mode in which only a button image is displayed as the selection button, for example, like a selection button (a kind-of-sheet button) 41 of FIG. 12B. Also, the selection button forming part 75 forms the selection button corresponding to the processing operation to which the second attribute is set, in a second display mode. In the embodiment, the second display mode of the selection button is a mode in which an image obtained by overlapping a padlock-formed restriction mark 55 on a button image is displayed as the selection button, for example, like a selection button (a copying initial value setting button) 44 of FIG. 12B. In addition, the selection button forming part 75 does not form the selection button corresponding to the processing operation to which the third attribute is set.

With regard to the selection button forming processing to be carried out by the selection button forming part 75, several examples will be cited. Firstly, examples of a case of forming the selection buttons on the home screen will be taken. FIG. 10A shows a home screen displayed on the touch panel display 12 when the user M is logged in the multifunction peripheral 1. As described above, the multifunction peripheral 1 does not apply restriction on the processing operation which the management authorized user can make the multifunction peripheral execute. Therefore, the execution restriction information with respect to the management authorized user is not provided. As an exception to the management authorized user, the selection button forming part 75 forms the selection buttons corresponding to all of the processing operations that can be executed by the multifunction peripheral 1 in response to the user selection, in the first display mode without basing on the execution restriction information relative to the management authorized user. As a result, in a screen 101 shown in FIG. 10A, all of the selection buttons that are disposed in the home screen 101, i.e., the copy button 21, the electric mail transmission button 22, the facsimile button 23, the document storage button 24, the application button 25 and the management setting button 26, are formed (displayed) in the first display mode.

Also, FIG. 10B shows a home screen displayed on the touch panel display 12 when the user X having the general authority is logged in the multifunction peripheral 1. As shown in FIG. 6, in the execution restriction information of the user X, the first attribute is set to each of the copy processing, the electric mail transmission processing, the facsimile processing and the document storage processing. In addition, with respect to application and management setting, the first attribute is set to each selection of the home screen. The selection button forming part 75 forms the selection buttons in the home screen on the basis of such execution restriction information of the user X. As a result, in a home screen 102 shown in FIG. 10B, the copy button 21, the electric mail transmission button 22, the facsimile button 23, the document storage button 24, the application button 25 and the management setting button 26 are formed in the first display mode.

In addition, FIG. 10C shows a home screen displayed on the touch panel display 12 when the user Y having the general authority is logged in the multifunction peripheral 1. As shown in FIG. 7, in the execution restriction information of the user Y, the first attribute is set to each of the copy processing, the electric mail transmission processing and the facsimile processing. On the other hand, the third attribute is set to the document storage processing. Further, with respect to application, the third attribute is set to selection of the home screen, and with respect to management setting, the first attribute is set to selection of the home screen. The selection button forming part 75 forms the selection buttons in the home screen on the basis of such execution restriction information of the user Y. As a result, in a home screen 103 shown in FIG. 10C, although the copy button 21, the electric mail transmission button 22, the facsimile button 23 and the management setting button 26 are formed in the first display mode, the document storage button 24 and the application button 25 are not formed (displayed).

Next, examples of a case of forming the selection buttons in the copy screen will be taken. The copy screen is a screen displayed when the copy button 21 in the home screen is pushed. FIG. 11A shows a copy screen displayed on the touch panel display 12 when the user M having the management authority is logged in the multifunction peripheral 1. As an exception to the management authorized user, the selection button forming part 75 forms all of the processing operations that can be executed by the multifunction peripheral 1 in response to the user selection, in the first display mode without basing on the execution restriction. As a result, in a copy screen 111 shown in FIG. 11A, all of the selection buttons that are disposed in the copy screen 111, i.e., a document size button 31, a sheet button 32, a density button 33, a color/monochrome button 34, a hue and saturation button 35, an expansion/reduction button 36 and a duplex printing and divisional printing button 37 are formed in the first display mode.

Also, FIG. 11B shows a copy screen displayed on the touch panel display 12 when the user X having the general authority is logged in the multifunction peripheral 1. As shown in FIG. 6, in the execution restriction information of the user X, the first attribute is set to all of the setting items related to copying. The selection button forming part 75 forms the selection buttons in the copy screen on the basis of such execution restriction information of the user X. As a result, in a copy screen 112 shown in FIG. 11B, similarly to FIG. 11A, all of the selection buttons that are disposed in the copy screen 112 are formed in the first display mode.

In addition, FIG. 11C shows a home screen displayed on the touch panel display 12 when the user Y having the general authority is logged in the multifunction peripheral 1. As shown in FIG. 7, among the setting items related to copying in the execution restriction information of the user Y, the third attribute is set to each of hue, saturation, duplex printing and divisional printing, and the first attribute is set to each of the setting items other than these items. The selection button forming part 75 forms the selection buttons in the copy screen on the basis of such execution restriction information of the user Y. As a result, in a home screen 113 shown in FIG. 11C, although the document size button 31, the sheet button 32, the density button 33, the color/monochrome button 34 and the expansion/reduction button 36 are formed in the first display mode, the hue and saturation button 35 and the duplex printing and divisional printing button 37 are not formed.

Next, examples of a case of forming the selection buttons in the management setting screen will be taken. The management setting screen is a screen displayed when the management setting button 26 in the home screen is pushed. FIG. 12A shows a management setting screen displayed on the touch panel display 12 when the user M having the management authority is logged in the multifunction peripheral 1. As an exception to the management authorized user, the selection button forming part 75 forms all of the processing operations that can be executed by the multifunction peripheral 1 in response to the user selection, in the first display mode without basing on the execution restriction. As a result, in a management setting screen 121 shown in FIG. 12A, all of the selection buttons that are disposed in the management setting screen 121, i.e., the kind-of-sheet button 41, a cartridge/manual bypass feed button 42, an error handling button 43, a copying initial value setting button 44, an electric mail transmission initial value setting button 45, a facsimile initial value setting button 46, a document storage initial value setting button 47, a network button 48, a security button 49 and a date button 50 are formed in the first display mode.

Also, FIG. 12B shows a management setting screen displayed on the touch panel 12 when the user X having the general authority is logged in the multifunction peripheral 1. As shown in FIG. 6, in the execution restriction information of the user X, among the setting items related to management setting, the first attribute is set to selection in the home screen, a kind of sheet, and cartridge/manual bypass feed. In addition, among the setting items related to management setting, the second attribute is set to each of the initial value settings of copying, electric mail transmission, facsimile and document storage. Further, among the setting items related to management setting, the third attribute is set to each of error handling, network, security and date. The selection button forming part 75 forms the selection buttons in the management setting screen on the basis of such execution restriction information of the user X. As a result, in a management setting screen 122 shown in FIG. 12B, the kind-of-sheet button 41 and the cartridge/manual bypass feed button 42 are formed in the first display mode, the copying initial value setting button 44, the electric mail transmission initial value setting button 45, the facsimile initial value setting button 46 and the document storage initial value setting button 47 are formed in the second display mode, and the error handling button 43, the network button 48, the security button 49 and the date button 50 are not formed.

In addition, FIG. 12C shows a management setting screen displayed on the touch panel display 12 when the user Y having the general authority is logged in the multifunction peripheral 1. As shown in FIG. 7, among the setting items related to management setting in the execution restriction information of the user Y, the first attribute is set to each of selection in a home screen, kind-of-sheet and cartridge/manual bypass feed, and the third attribute is set to each of other setting items. The selection button forming part 75 forms the selection buttons in the management setting screen on the basis of such execution restriction information of the user Y. As a result, in a management setting screen 123 shown in FIG. 12C, the kind-of-sheet button 41 and the cartridge/manual bypass feed button 42 are formed in the first display mode, and the error handling button 43, the copying initial value setting button 44, the electric mail transmission initial value setting button 45, the facsimile initial value setting button 46, the document storage initial value setting button 47, the network button 48, the security button 49 and the date button 50 are not formed.

(Operation of Multifunction Peripheral)

Figure 13:
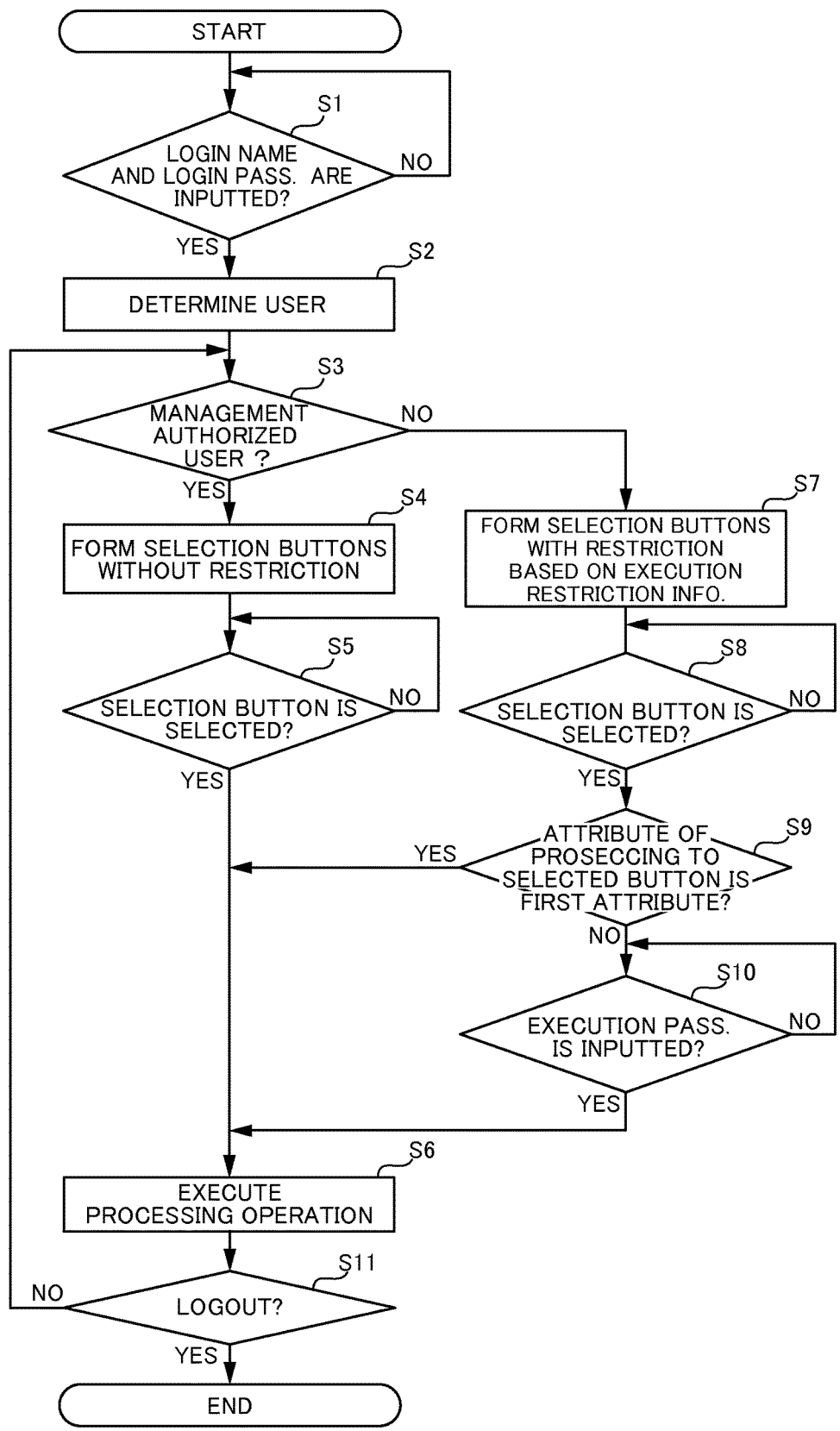
FIG. 13 is a flowchart showing an operation of the multifunction peripheral as the image forming apparatus according to the embodiment of the present disclosure.
Figure 14:
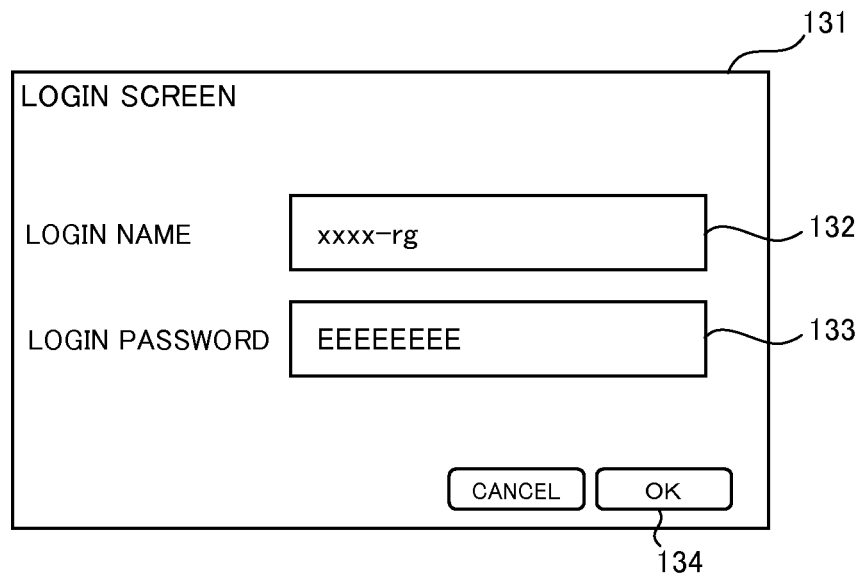
FIG. 14 is a plan view showing a login screen in the multifunction peripheral as the image forming apparatus according to the embodiment of the present disclosure.
Figure 15:
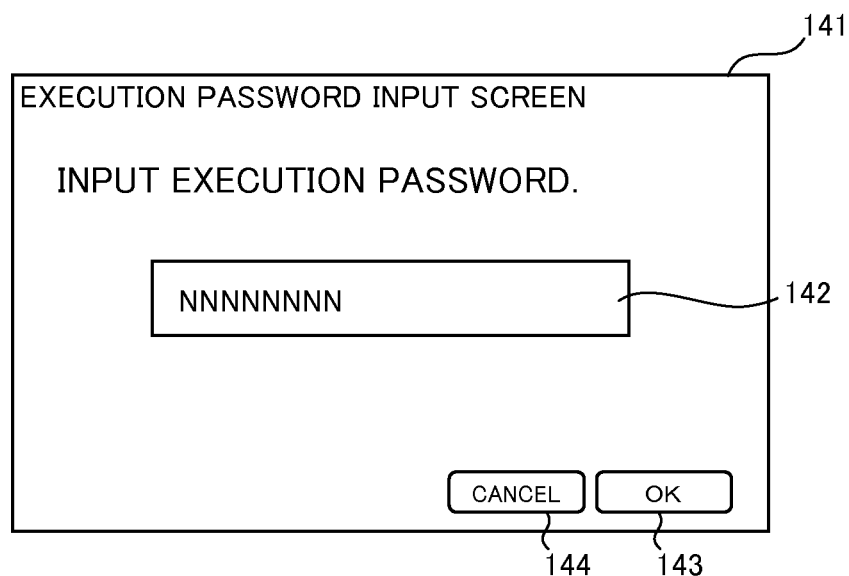
FIG. 15 is a plan view showing an execution password input screen in the multifunction peripheral as the image forming apparatus according to the embodiment of the present disclosure.

FIG. 13 shows an operation of the multifunction peripheral 1. FIG. 14 shows a login screen, and FIG. 15 shows an execution password input screen. The multifunction peripheral 1, at the time of login by the user, determines the user; carries out the processing operation to form the selection buttons in the screen of the touch panel display 12 of the operating panel 11 on the basis of the execution restriction information of the determined user; and executes the copy processing, the settings related to copying, the electric mail transmission processing, the settings related to electric mail transmission, the facsimile processing, the settings related to facsimile, the document storage processing, the settings related to document storage, the processing by application or the management setting, in response to a selection of the selection button by the user and an input of the execution password by the user if required. FIG. 13 shows the flow of such an operation.

In FIG. 13, if the user pushes the login/logout button 14 of the operating panel 11, the user determination part 74 of the multifunction peripheral 1 displays a login screen 131 as shown in FIG. 14 on the touch panel display 12. If the user respectively inputs a valid login name and a valid login password to a login name input unit 132 and a login password input unit 133 of the login screen 131 and then pushes a completion button 134 (step S1: YES), the user determination part 74 crosschecks the inputted login name and the inputted login password with respect to the login name and login password in the user information stored in the storage unit 65, and determines (specifies) the user (step S2).

In a case where the user having logged-in is the management authorized user (step S3: YES), the selection button forming part 75 forms, in the first display mode in the screen of the touch panel display, all of the selection buttons to be disposed in one screen among the selection buttons corresponding to the respective processing operations that can be executed by the multifunction peripheral 1 in response to the user selection (step S4). Afterwards, when the user having logged-in pushes any one of the selection buttons that are formed in the screen (step S5: YES), the processing operation executing part 76 executes the processing operation corresponding to the pushed selection button (step S6).

On the other hand, in a case where the user having logged-in is the general authorized user (step S3: NO), upon carrying out the processing operation to form the selection buttons to be disposed in one screen, the selection button forming part 75 refers to the execution restriction information included in the user information of the user stored in the storage unit 65; determines on the basis of the attribute set to each processing operation whether or not the selection buttons are formed; and determines the display mode in a case where the selection buttons are formed (step S7). Afterwards, when the user having logged-in pushes any one of the selection buttons that are formed in the screen (step S8: YES), the processing operation executing part 76 refers to the execution restriction information included in the user information of the user having logged-in; recognizes the attribute set to the processing operation corresponding to the pushed selection button; and executes the processing operation corresponding to the pushed selection button (step S6) in a case where the attribute is the first attribute (step S9: YES).

On the other hand, in a case where the attribute set to the processing operation corresponding to the selection button pushed by the user having logged-in that is the general authorized user is the second attribute (step S9: NO), the processing operation executing part 76 displays an execution password input screen 141 as shown in FIG. 15 on the touch panel display 12. If the user inputs a valid execution password to the execution password input unit 142 of the execution password input screen 141 and then pushes the completion button 143 (step S10: YES), the processing operation executing part 76 executes the processing operation corresponding to the pushed selection button (step S6). In a case where the invalid password is not inputted (step S10: NO), the processing operation executing part 76 does not execute the processing operation corresponding to the pushed selection button until the valid execution password has been inputted. The user who cannot input the valid execution password pushes a cancel button 144 in the execution password input screen 141, and can stop execution of the processing operation corresponding to the pushed selection button.

After execution of the processing operation in step S6 has been completed, the multifunction peripheral 1 displays, on the touch panel display 12, a screen for requesting the user to log out or to continue the work employing the multifunction peripheral 1, for example (step S11). In a case where the user has selected logout (step S11: YES), the multifunction peripheral 1 makes the user log out and then completes the processing operation shown in FIG. 13. On the other hand, in a case where the user has selected continuing the work (step S11: NO), the multifunction peripheral 1 maintains a state in which the user has logged in, and continues the processing operation shown in FIG. 13.

As a result of such an operation of the multifunction peripheral 1, the general authorized user can make the multifunction peripheral 1 execute the processing operation for which the first attribute has been set, without inputting the execution password by pushing the selection button that is formed in the screen; can make the multifunction peripheral 1 execute the processing operation for which the second attribute has been set, by pushing the selection button that is formed in the screen and then inputting the execution password; and cannot make the multifunction peripheral 1 execute the processing operation for which the third attribute has been set, because no selection button exists in the screen. Therefore, the general authorized user who has been informed of the execution password can make the multifunction peripheral 1 execute only the processing operation for which the first attribute has been set and the processing operation for the second attribute has been set, among the processing operations that can be executed by the multifunction peripheral 1 in response to the user selection. On the other hand, the general authorized user who has not been informed of the execution password can make the multifunction peripheral 1 execute only the processing operation for which the first attribute has been set, among the processing operations that can be executed by the multifunction peripheral 1 in response to the user selection. That is, according to whether or not to have the general authorized user informed of the execution password, the scopes of the processing operations that the general authorized user can make the multifunction peripheral 1 execute can be made different. Thus, with the multifunction peripheral 1 according to the embodiment of the present disclosure, the authority of the general authorized user can be subdivided without carrying out the work of setting related to the restriction on execution of the processing operations relative to the multifunction peripheral 1, the burden on the work of setting can be mitigated, and the convenience as to utilization of the multifunction peripheral 1 can be enhanced.

In addition, for example, in a case where the general authorized user temporarily acts for part of the duties of the management authorized user and other cases, the scopes of the processing operations that the general authorized user can make the multifunction peripheral 1 execute can be extended by having the general authorized user informed of the execution password. Thus, in accordance with the multifunction peripheral 1 according to the embodiment of the present disclosure, the scopes of the processing operations that the general authorized user can make the multifunction peripheral 1 execute can be extended without carrying out the work of setting related to the processing operation execution restriction relative to the multifunction peripheral 1 and without teaching the login name and the login password of the management authorized user to the general authorized user. Therefore, the convenience as to utilization of the multifunction peripheral 1 can be improved, and a high security can be ensured. Moreover, it is possible to prevent a change without any prior notice by the general authorized user as to essential settings in the multifunction peripheral 1.

In addition, in accordance with the multifunction peripheral 1 according to the embodiment of the present disclosure, settings of the attributes of the respective processing operations in the multifunction peripheral 1 can be made different for each general authorized user, and thereby, the scopes of the processing operations that can be executed by the multifunction peripheral 1 can also be made different for each general authorized user.

Further, in accordance with the multifunction peripheral 1 according to the embodiment of the present disclosure, the execution passwords can be made different for each user and for each processing operation in the multifunction peripheral 1, and thereby, the scopes of the processing operation that the general authorized user can make the multifunction peripheral 1 execute can be variously changed. For example, the general authorized user who has been informed of all of the respective execution passwords corresponding to the respective processing operations for which the second attribute has been set can make the multifunction peripheral 1 execute all of the processing operations for which the second attribute has been set. Furthermore, the general authorized user who has been informed of a part of the execution passwords corresponding to the respective processing operations for which the second attribute has been set can make the multifunction peripheral 1 execute a part of the processing operations for which the second attribute has been set. Still furthermore, the general authorized user who has not been informed of all of the respective execution passwords corresponding to the respective processing operations for which the second attribute has been set cannot make the multifunction peripheral 1 execute all of the processing operations for which the second attribute has been set at all. Thus, the scopes of the processing operations that can be executed by the multifunction peripheral 1 can be variously changed.

Moreover, in accordance with the multifunction peripheral 1 according to the embodiment of the present disclosure, it is possible to restrict execution of the processing operations by setting the attributes with respect to not only the processing operations (jobs) including image forming processing, such as copying, electric mail transmission, facsimile or document storage, but also setting processing operations of modes, conditions or restrictions on these processing operations. Further, it is possible to restrict execution of the processing operation by setting the attribute with respect to the processing operations of applications. Furthermore, it is possible to restrict execution of the processing operation by setting the attribute with respect to the processing operation, like the management setting, to set operating modes, operating conditions or operating restrictions on the multifunction peripheral 1 other than image forming processing. In this manner, improvement of the convenience as to utilization of the multifunction peripheral 1 and improvement of the security can be achieved.

Further, in the multifunction peripheral 1 according to the embodiment of the present disclosure, no selection button is formed in the screen of the touch panel display 12 with respect to the processing operations for which the third attribute has been set. In this manner, operability of the multifunction peripheral 1 by the general authorized user can be enhanced. For example, in the copy screen 113 shown in FIG. 11C, the hue and saturation button 35 and the duplex printing and divisional printing button 37 related to copying do not exist. In the copy processing, adjustment of hue or saturation and processing of duplex printing or divisional printing is advanced, and these settings may occasionally require skillfulness. The selection buttons as to such advanced settings are not displayed, and thereby, the user can easily make the multifunction peripheral 1 execute the copy processing without worrying about cumbersomeness of such advanced settings.

Figure 16:
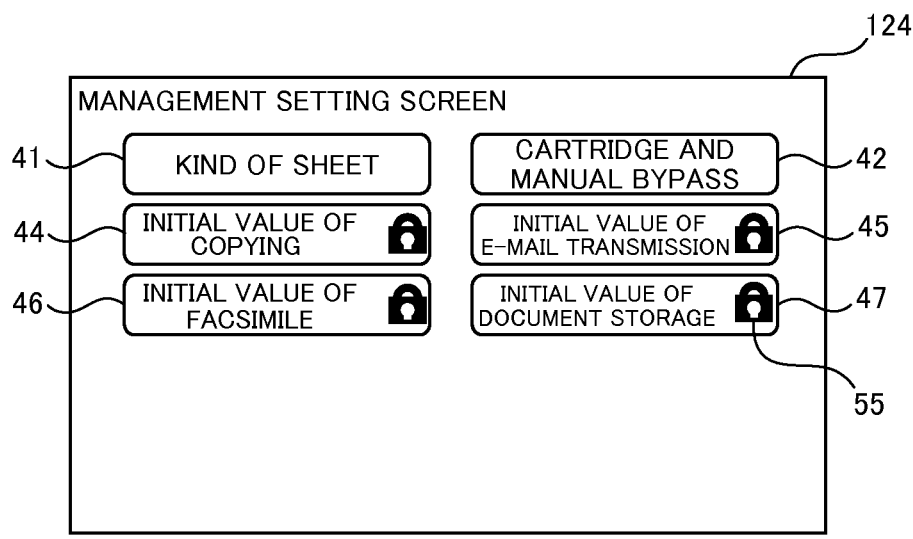
FIG. 16 is a plan view showing another example of the management setting screen in the multifunction peripheral as the image forming apparatus according to the embodiment of the present disclosure.

Incidentally, although the embodiment as described above controls on the basis of the attributes set to the processing operations that can be executed by the multifunction peripheral 1 in response to the user selection whether or not the selection buttons are formed in one screen, even in a case where there is a selection button which is not formed in the screen, the positions of the selection buttons that are formed in the screen are not changed. As a result, in the screen, a space is formed at a portion at which no selection button is formed. For example, in FIG. 12B, because the error handling button 43 is not formed, a space is formed between the kind-of-sheet button 41 and the electric mail transmission initial value setting button 45. In the present disclosure, as another different embodiment from this, in a case where there is the selection button which is not formed in the screen, the positions of the selection buttons that are formed in the screen may be changed. As in a management setting screen 124 shown in FIG. 16, for example, in a case where the error handling button 43 is not formed, the position of the copying initial value setting button 44 and others may be changed so that no space is formed between the selection buttons. In this manner, operability of the multifunction peripheral 1 can be improved.

Figure 17:
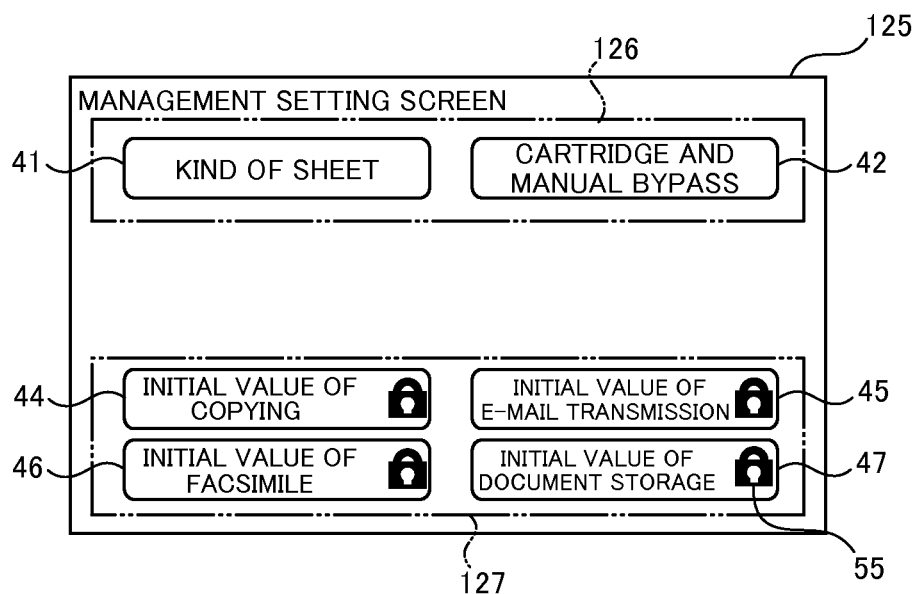
FIG. 17 is a plan view showing still another example of the management setting screen in the multifunction peripheral as the image forming apparatus according to the embodiment of the present disclosure.

Moreover, in the embodiments as described above, although the display modes of the selection buttons that are formed in one screen are made different on the basis of the attributes set to the processing operations that can be executed by the multifunction peripheral 1 in response to the user selection, the positions of the selection buttons that are formed in the screen are not changed. As a result, in the screen, the selection buttons with different display modes are intermixed. In the present disclosure, as another different embodiment from this, in a case where the selection buttons with different display modes are formed in the screen, the positions of the selection buttons that are formed in the screen are changed, for example, as in a management setting screen 125 shown in FIG. 17, it may be that the selection buttons 41, 42 in the first display mode are collectively disposed in an upper region 126 (one region) in the screen, and the selection buttons 44, 45, 46, 47 in the second mode is collectively disposed in a lower region 127 (another region) in the screen. In this manner, since the selection buttons in the screen are disposed in order, operability of the multifunction peripheral 1 can be improved. According to this, the general authorized user who has not been informed of the password for executing the processing operation for which the second attribute has been set can be made readily or easily grasp the selection buttons corresponding to the processing operations that cannot be executed by himself or herself, and operability of the image forming apparatus can be enhanced.

The multifunction peripheral 1 according to the embodiment as described above includes the management setting button 19 as a hardware push button. In a case where the third attribute has been set for selection in the home screen with respect to management setting, if the general authorized user has pushed the management setting button 19 as this hardware push button, a warning buzzer, such as a beep, may be sounded so as to thereby inform the general authorized user of the fact that management setting cannot be provided.

Moreover, in the embodiment as described above, when the management authorized user registers the user as the general authorized user to the multifunction peripheral 1, the management authorized user sets the attribute for each of the processing operations that can be executed by the multifunction periphery 1 in response to the user selection. As a function related to this matter, there may be provided a function by which it is defined in advance which attribute is to be set for each of the processing operations as to a typical general authorized user, and when the user registration is actually carried out, in a case where the user is registered as the typical general authorized user, the attributes of the respective processing operations as to the user are set in all by applying definitions of attribute settings of the respective processing operations that have been carried out in advance. In this manner, a burden of the user registration work of the management authorized user can be mitigated.

In addition, although, in the embodiment as described above, the case where there are the management authorized user and the general authorized user as the users of the multifunction peripheral 1 was taken as an example, in the present disclosure, in addition to these two authorities, a third authorized user, for example, a guest authorized user may be added. That is, although the foregoing embodiment described that execution of the processing operation is permitted after the user registration and logging in the multifunction peripheral 1 as to the management authorized user and as to the general authorized user, the multifunction peripheral 1 includes a function to make an unregistered user execute, without login, the processing operation which is considered to be simple and be free of lowered security, for example, merely copying the document to the sheet. The authority to enable the unregistered user to execute some processing operations of the multifunction peripheral 1 without login is the guest authority. In this case, as a method of restricting the processing operations permitted to be executed by the unauthorized user (the guest authorized user) who does not log in, there may be applied a method of setting any one of the first attribute, the second attribute and the third attribute for the respective processing operations that can be executed by the multifunction peripheral 1 in response to the user selection. Further, it may be that the management authorized user can change attribute settings of the respective processing operations as to the unregistered user who does not log in. In this manner, an available embodiment of the multifunction peripheral can be extended, and the convenience can be enhanced.

Further, although the processing operation shown in FIG. 4 was taken as an example of the processing operations that can be executed by the multifunction peripheral 1 of the embodiment described above, in response to the user selection, this is merely provided as an example, part of the processing operations shown in FIG. 4 may be omitted, or alternatively, another processing may be added to the processing operations shown in FIG. 4.

The present disclosure is not restricted by the multifunction peripheral. The disclosure may be applied to another image forming apparatus with limited features, such as a dedicated copying machine or a dedicated facsimile.

While the present disclosure has been described with reference to the particular illustrative embodiments, it is not to be restricted by the embodiments. It is to be appreciated that those skilled in the art can change or modify the embodiments without departing from the scope and spirit of the present disclosure.

What is claimed is:

1. An image forming apparatus for executing a plurality of processing operations including processing operations related to image forming, comprising:
    an operating panel having a touch panel display; and
    a control unit,
    wherein the control unit is executed as:
    a user determination part which determines on the basis of identification information inputted by a user whether the user is a first authorized user having at least first authority or a second authorized user having second authority;
    an attribute setting part which sets, with respect to each of the plurality of processing operations, a first attribute which permits execution without password input being set as a condition, a second attribute which permits execution with password input being set as a condition, or a third attribute which does not permit execution;
    a selection button forming part which displays button images in a screen of the touch panel display to thereby form a selection button corresponding to any of the plurality of processing operations and switches whether or not the button image is displayed to thereby control whether or not the selection button is formed with respect to each of the plurality of processing operations, wherein the selection button forming part forms a plurality of the selection buttons respectively corresponding to all of the plurality of processing operations, in a case where the user determination part determines that the user is the first authorized user, and forms a plurality of the selection buttons respectively corresponding to the processing operations to which the first attribute or the second attribute has been set and does not forms the selection buttons corresponding to the processing operations to which the third attribute has been set, in a case where the user determination part determines that the user is the second authorized user; and
    a processing operation executing part which executes, when the user having been determined as the first authorized user by the user determination part has selected any one of the plurality of the selection buttons that are formed by the selection button forming part, the processing operation corresponding to the selected selection button;
    executes, when the user having been determined as the second authorized user by the user determination part has selected the selection button corresponding to the processing operation to which the first attribute has been set, among the plurality of the selection buttons that are formed by the selection button forming part, the processing operation corresponding to the selected selection button; and
    requests a password input, when the user having been determined as the second authorized user by the user determination part has selected the selection button corresponding to the processing operation to which the second attribute has been set, among the plurality of the selection buttons that are formed by the selection button forming part, and executes, when a valid password has been inputted, the processing operation corresponding to the selected selection button.

2. The image forming apparatus according to claim 1, wherein the control unit is further executed as:
    a user registration part which registers a plurality of the second authorities,
    wherein the attribute setting part provides setting of the first attribute, the second attribute or the third attribute with respect to each of the plurality of processing operations for each of the plurality of second authorities who are registered in the user registration part.

3. The image forming apparatus according to claim 1, wherein
    the attribute setting part makes the user provide setting of the first attribute, the second attribute or the third attribute with respect to each of the plurality of processing operations, in only a case where the user determination part determines that the user is the first authorized user.

4. The image forming apparatus according to claim 1, wherein
    the processing operation executing part executes not only the processing operations related to image forming, but also the plurality of processing operations including the processing operation to set an operating mode, an operating condition or an operating restriction of the image forming apparatus.

5. The image forming apparatus according to claim 1, wherein the control unit is further executed as:
    a password setting part which sets a password for executing the processing operation to which the second attribute has been set by the attribute setting part,
    wherein the password setting part sets respectively different passwords with respect to the plurality of processing operations to which the second attribute has been set by the attribute setting part.

6. The image forming apparatus according to claim 1, wherein
    the selection button forming part differentiates display modes of the selection button corresponding to the processing operation to which the first attribute has been set and the selection button corresponding to the processing operation to which the second attribute has been set, so as to enable the user to visually recognize the selection button corresponding to the processing operation to which the first attribute has been set and the selection button corresponding to the processing operation to which the second attribute has been set.

7. The image forming apparatus according to claim 1, wherein
    the selection button forming part, in the screen of the touch panel display, collectively disposes in one region the plurality of the selection buttons corresponding to the processing operations to which the first attribute has been set, and collectively disposes in another region the plurality of the selection buttons corresponding to the processing operations to which the second attribute has been set.

* * * * *